June 6, 1939. H. K. PAINTER 2,160,983
MIXING AND DISPENSING APPARATUS
Original Filed Jan. 6, 1933 6 Sheets-Sheet 1

INVENTOR.
BY Harry K. Painter
Wood & Wood
ATTORNEYS

June 6, 1939.  H. K. PAINTER  2,160,983
MIXING AND DISPENSING APPARATUS
Original Filed Jan. 6, 1933  6 Sheets-Sheet 2

INVENTOR.
Harry K. Painter
BY Wood & Wood
ATTORNEYS

June 6, 1939. H. K. PAINTER 2,160,983
MIXING AND DISPENSING APPARATUS
Original Filed Jan. 6, 1933   6 Sheets-Sheet 3

INVENTOR.
BY Harry K. Painter
Wood & Wood
ATTORNEYS

June 6, 1939.  H. K. PAINTER  2,160,983
MIXING AND DISPENSING APPARATUS
Original Filed Jan. 6, 1933  6 Sheets-Sheet 6

INVENTOR.
Harry K. Painter
BY
Word & Word
ATTORNEYS

Patented June 6, 1939

2,160,983

UNITED STATES PATENT OFFICE 2,160,983

MIXING AND DISPENSING APPARATUS

Harry K. Painter, Mansfield, Ohio, assignor to The Bock Machine Company, Cincinnati, Ohio, a corporation of Ohio Original application January 6, 1933, Serial No. 650,449. Divided and this application November 21, 1935, Serial No. 50,893

3 Claims. (Cl. 225—21)

This invention relates to the art of preparing drinks, and is particularly directed to an improved apparatus for mixing and dispensing drinks.

This application is filed as a division of my copending application filed by me January 6, 1933, Serial Number 650,449.

It is an object of this invention to provide an improved apparatus for mixing and dispensing drinks in which any one of a number of flavoring syrups, or any other ingredients, may be introduced into carbonated water and thoroughly and completely mixed therewith as the carbonated water is being forcibly delivered to the glass; in which the supply of syrup or ingredient for each drink is accurately measured and is delivered directly into the path of delivery of the carbonated water; and in which a novel arrangement of control spigot, valve, and discharge tube is incorporated.

Other objects and certain advantages will be more fully apparent from a description of the accompanying drawings, in which.

The embodiment of the invention herein disclosed comprises a rectangular base frame 10 supported at its corners upon legs 11. The frame 10 supports a cabinet 12 having side walls 13 and 14, a rear wall 15, a front wall 16, and a cover 17 provided with a handle 18. The cover 17 is hinged, as at 19, to the rear wall 15. Disposed about the upper inner periphery of the cabinet 12 is a member 20 from which is suspended a rectangular metal ice-box 21, spaced from the walls of the cabinet 12; and between the walls of the ice-box 21 and the walls of the cabinet 12 is disposed insulating material 22 of cork, or the like, insulating the walls of the cabinet 12 from the ice-box 21, and the cover 17 is similarly insulated therefrom. An adjustable supporting member 23 is mounted on the bottom of the cabinet 12 and supports the cabinet 12 at its bottom midsection.

An aperture is provided in the bottom of the cabinet 12 for a conduit 24 leading from a source of water supply, connected to an elbow 25 threaded to a conduit 26 which extends in close proximity to the bottom 27 of the ice-box 21 and to the rear wall 28 of a carbonator tank 29 mounted on the bottom 27, for a purpose hereinafter described. The conduit 26 extends for several lengths, as indicated at 30, between the front wall 31 of the carbonator tank 29 and the front wall 32 of the ice-box 21, and then extends upwardly adjacent the end wall 33 of the carbonator tank 29, terminating in an elbow 34 threaded to a reduced conduit 35 which extends downwardly in a coil, as indicated at 36, between the rear wall 37 of the carbonator tank 29 and the rear wall 38 of the ice-box 21, and thence upwardly and transversely above the cover 39 of the carbonator tank 29, terminating in a valve casing 40. The conduits as arranged provide a lengthy passage for the water prior to its use, and the water is cooled to a low temperature by covering the conduit coil 36 with cracked ice or the like.

Figure 1:
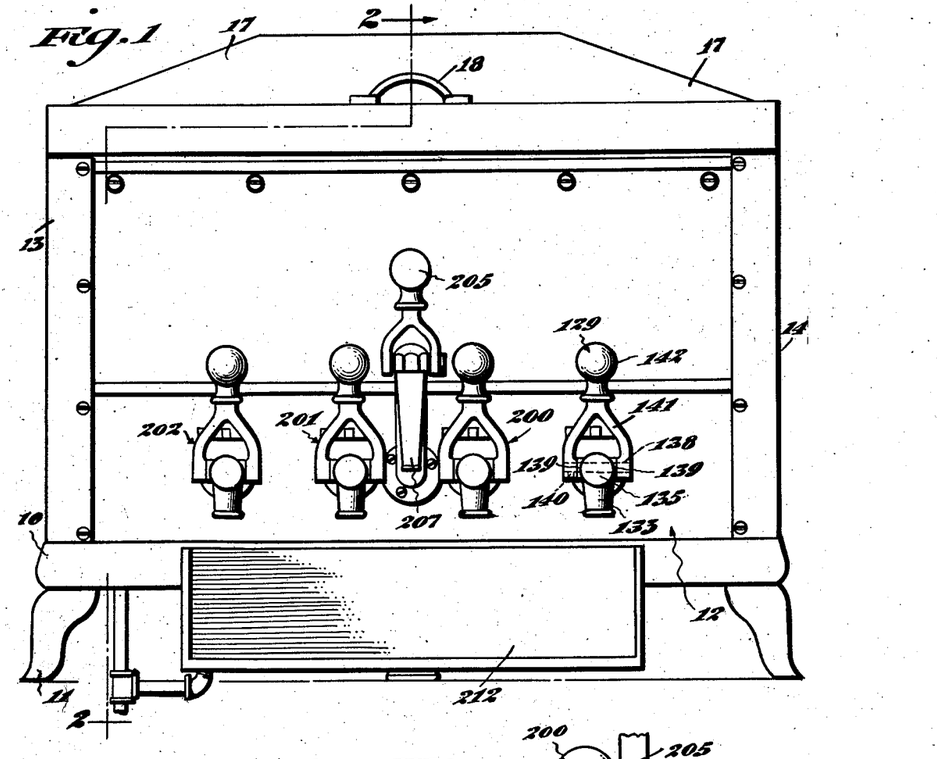
Figure 1 is a front elevational view of an embodiment of the invention.
Figure 2:
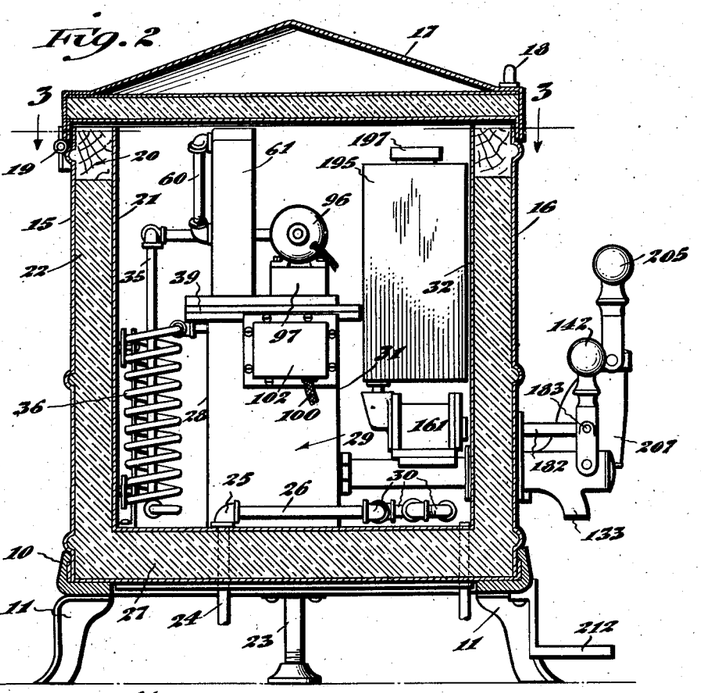
Figure 2 is a vertical sectional view, corresponding substantially to the line 2—2 of Figures 1 and 3.
Figure 3:
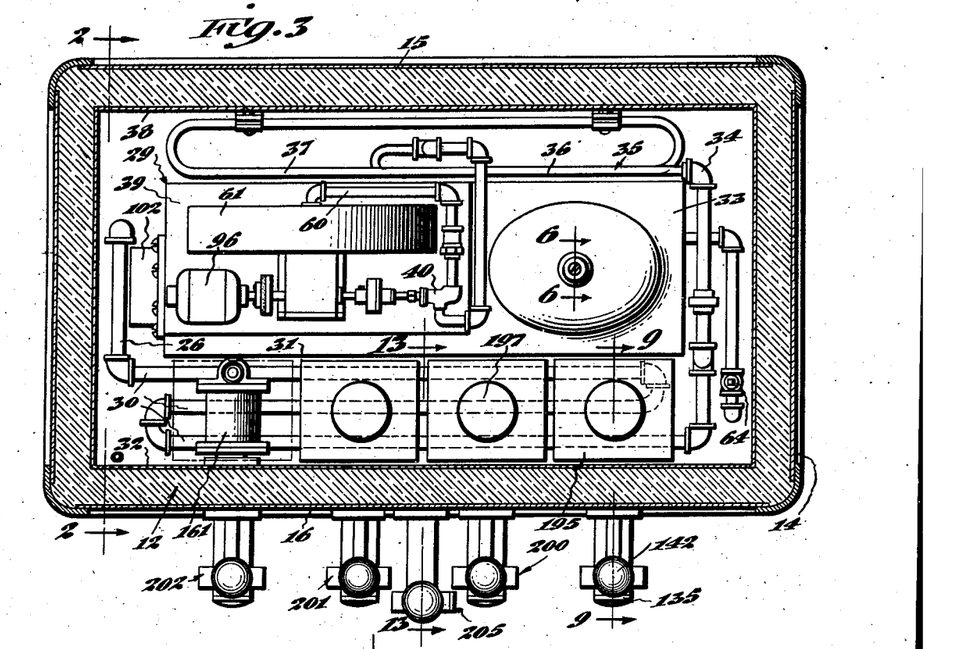
Figure 3 is a horizontal sectional view, corresponding substantially to the line 3—3 of Figure 2.
Figure 4:
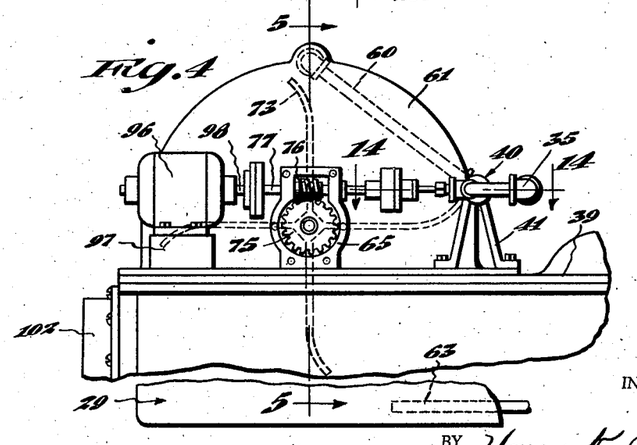
Figure 4 is an enlarged fragmentary, front elevational view, disclosing means for actuating the valve control means and agitating means.
Figure 5:
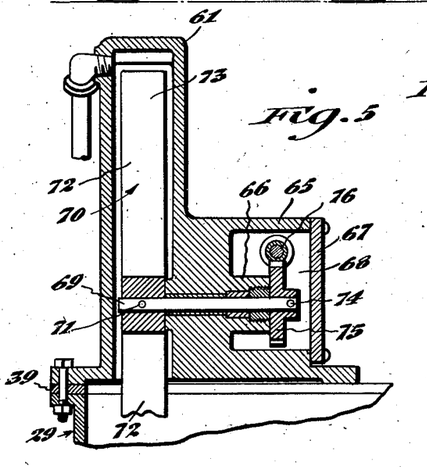
Figure 5 is an enlarged fragmentary, vertical sectional view, corresponding substantially to the line 5—5 of Figure 4.
Figure 6:
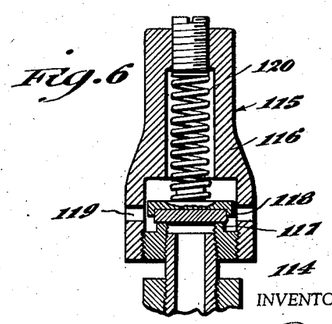
Figure 6 is an enlarged fragmentary, vertical sectional view, corresponding substantially to the line 6—6 of Figure 3, disclosing a safety valve.
Figure 7:
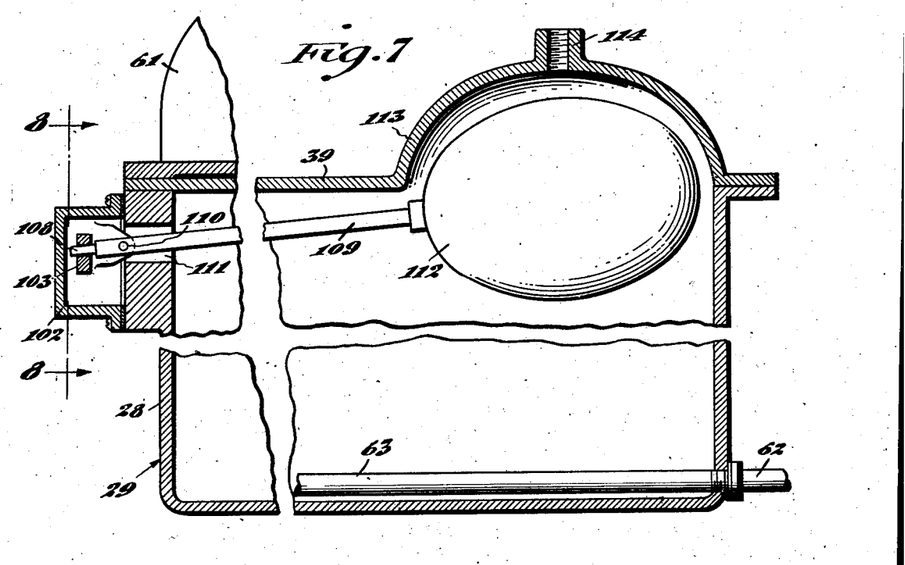
Figure 7 is an enlarged fragmentary, vertical sectional view, disclosing a control means embodied in this invention.

The valve casing 40 (see Figure 4) is supported by a bracket 41 mounted on the cover 39 and comprises a reduced port 42 (see Figure 14) communicating at one end with the conduit 35 and at the opposite end with a valve chamber 43, which communicates with a chamber 44 through a reduced port 45, provided with a valve seat 46 engageable by a valve 47 threaded to the inner end of a reciprocating valve stem 48 extending through a gland nut 49 threaded in the valve casing 40. Disposed about the valve stem 48 is a packing member 50 secured by a nut 51 to the gland nut 49 and valve stem 48. A conduit 52 has one end threaded to the valve casing 40 and communicates with the chamber 44, and the opposite end thereof is threaded into one end of a sleeve 53 having a reduced port 54. The other end of the sleeve 53 has a reduced portion 55 frictionally embraced by a soft rubber valve 56 having a slotted collapsible opening 56ª, which permits fluid to pass therethrough from the conduit 52, but automatically prevents back-flow of fluid into the conduit 52 and its connected conduit members.

A coupling 57 is screw-threaded to the sleeve 53 and embraces the one way valve 56 in spaced relation, forming a chamber 58 thereabout, and the coupling 57 is provided with a reduced port 59 which communicates with a conduit 60 threaded into the other end of the coupling 57, and the conduit 60 in turn communicates with the upper portion of an agitator paddle housing 61 mounted on the cover 39 of the carbonator tank 29 and communicating with the interior of the carbonator tank 29, thereby providing conduit means traversing considerable distance with respect to the area of the ice-box 21 to convey water from the source of supply to the carbonator tank 29.

A carbonic gas conduit 62 (see Figure 4) has one end connected to the source of carbonic gas supply, not shown, and the other end 63 terminating in the carbonator tank 29 adjacent the bottom thereof beneath the agitator paddle housing 61. A pressure valve (not shown) for regulating the pressure from the carbonic gas supply is set to deliver a constant flow of gas at a predetermined pressure; and a gas check-valve 64 is inserted in the gas conduit 62 to prevent back-flow of gas from the carbonator tank 29 and permit entrance of the gas into the carbonator tank 29.

Integral with the agitator paddle housing 61 is a flange 65 enclosing a boss 66, and the flange 65 is closed by a cover plate 67, thus providing a gear box 68 adapted to be filled with oil or grease. Journalled in the boss 66 is a shaft 69 carrying at one end an agitator paddle 70 secured thereto by a pin 71. The agitator paddle 70 is adapted to rotate within the housing 61 and is provided with vanes 72 curved at their free ends, as at 73. Fixed to the opposite end of the shaft 69, by a pin 74, is a worm-gear 75 adapted to mesh with a worm-wheel 76 secured to the midsection of a shaft 77 which extends through opposite sides of the flange 65.

When rotative movement is imparted to the shaft 69, the agitator paddle 70 is rotated, and the curved vanes 72 agitate the water and carbonic gas in the carbonator tank 29, causing the carbonic gas to permeate the water, producing a carbonated water suitable for mixture with flavoring syrups or for use unadulterated.

Water traversing the water conduit means herein described is cooled to a low temperature before entering the carbonator tank 29 and prior to coming into contact with the carbonic gas. I find that with my method of preparing carbonated water by cooling the water prior to mixing with the carbonic gas and then agitating the water and gas in a cold state, that a larger amount of gas can be absorbed by the cold water than if the water were mixed at normal temperature with the gas; furthermore, the gas is more completely absorbed by the cold water, thereby retaining the characteristics of carbonic gas in the water for a longer period of time, than is obtained in the conventional method of carbonating water.

One end of the shaft 77 is adjustably secured within one end of a sleeve 79 (see Figure 14) by means of a screw 80, and the sleeve 79 is rotatably mounted within a cup-shaped member 81, of a fly-wheel construction 82. Secured to the flanged extremity of the cup-shaped member 81, by means of screws 83, is a member 84, having a projecting boss 85 inwardly threaded as at 86, adapted to receive the threaded end 87 of the sleeve 79, and provided with a pin 88 extending transversely therefrom into the cup portion of the member 81. The pin 88 is adapted to engage a stud 89 secured to the member 84.

Adjacent the threaded portion 86 in the boss 85 is secured an outer ball race 90, and an inner ball race 91 is secured to the end of the valve stem 48 by a nut 92. Interposed between the races 90 and 91 are balls 93 providing a ball bearing arrangement which permit the fly-wheel 82 to rotate freely about the sleeve 79 and the valve stem 48, and prevent linear movement of the fly-wheel 82 along the valve stem 48. The outer end of the boss 85 is closed by a plate 94 detachably secured to the boss 85 by screws 95.

Figure 14:
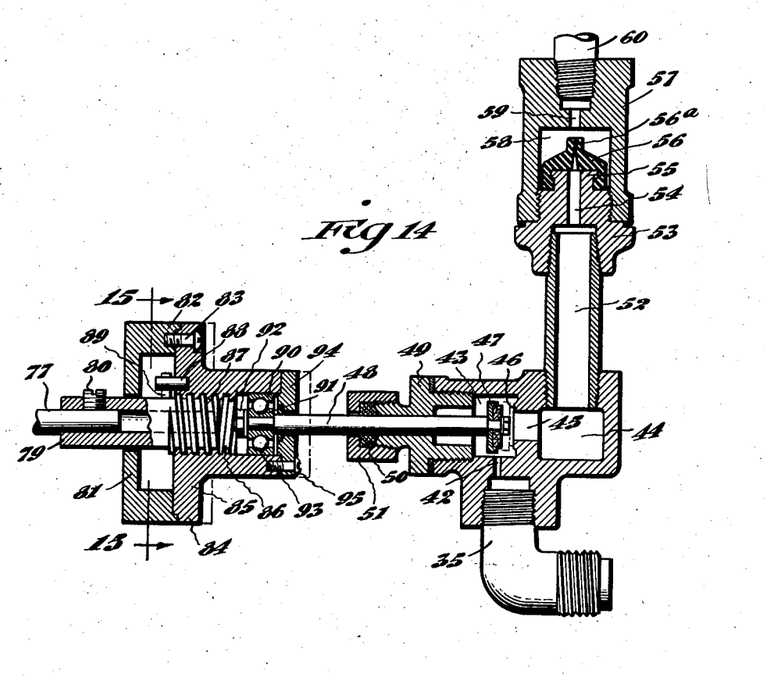
Figure 14 is an enlarged vertical sectional view, corresponding substantially to the line 14—14 of Figure 4.
Figure 15:
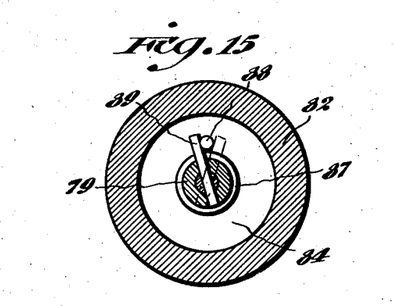
Figure 15 is a vertical sectional view, corresponding substantially to the line 15—15 of Figure 14.
Figure 16:
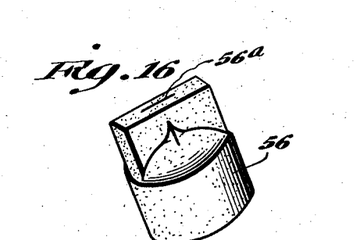
Figure 16 is a perspective view of a check valve embodied in the invention.

When the shaft 77 is rotated to the left, as viewed in Figure 14, the sleeve 79 also rotates to the left, but the fly-wheel 82 does not rotate, due to its inertia. However, the threaded movement of the sleeve 79 in the fly-wheel 82 causes linear movement of the fly-wheel 82 to the right, which in turn moves the valve stem 48 to the right and closes the valve 47, preventing additional water entering the carbonator tank 29. The threading movement of the sleeve 79 to the left is limited by the pin 88 abutting the opposite side of the stud 89, as shown in broken lines in Figure 15, at which time the fly-wheel 82 is positively engaged and rotates to the left with the sleeve 79. When the shaft 77 ceases to rotate the fly-wheel 82 continues to rotate, due to its inertia, and threads the fly-wheel 82 on to the sleeve 79, causing linear movement of the fly-wheel 82 to the left, which movement is limited by the pin 88 abutting the stud 89, as shown in solid lines in Figure 15. This latter threaded advancement to the left, as viewed in Figure 14, is sufficient to pull the valve stem 48 to the left and open the valve 47, permitting water to flow to the carbonator tank 29.

A motor 96 is mounted on a platform 97 and the shaft 98 of the motor 96 is connected to the end of the shaft 77. When the motor 96 is operating, it imparts rotative movement to the shaft 77 which in turn actuates the agitator paddle 70 and the valve stem 48, as hereinbefore described.

An electrical circuit 100, not completely shown, includes a mercury switch 101, or other suitable switch means, enclosed in a sealed compartment 102 fixed to the end wall 28 of the carbonator tank 29. The switch 101 is provided with a lever arm 103 pivotally mounted, at about its midsection, on the end wall 28, and the lever arm 103 has at one end fingers 104, securing a sealed glass tube 105 carrying at one end electrodes 106. In the tube 105 is a quantity of mercury, which makes or breaks the circuit through the electrodes 106, depending upon the inclination of the tube 105 and the resultant location of the mercury, either in or out of contact with the electrodes 106. The opposite end of the lever arm 103 is provided with an elongated slot 107 in which is inserted one end 108 of a float rod 109 pivotally secured, as at 110. This arm extends through a slot 111 in the wall 28 of the carbonator tank 29 and carries at its other end a float 112 adapted to be moved in a vertical arcuate line by the carbonated water in the carbonator tank 29. The cover 39 of the carbonator tank 29 has an upwardly bulged portion 113 to accommodate the float 112. The bulged portion 113 is provided with an inwardly threaded boss 114 for the reception of a safety valve 115. This valve includes a valve casing 116, a valve seat 117, a valve 118, outlets 119, and an adjustable pressure spring 120, permitting the valve 118 to be unseated at a predetermined gas pressure within the carbonator tank 29.

Figure 8:
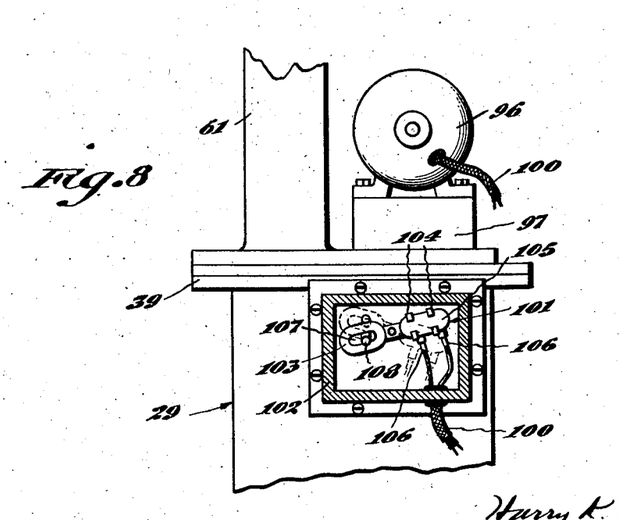
Figure 8 is an enlarged fragmentary, vertical sectional view, corresponding substantially to the line 8—8 of Figure 7.

The level of the water in the carbonator tank 29 controls the movement of the float 112. When the carbonated water supply is depleted to a predetermined level, the float rod 109 automatically actuates the switch lever arm 103 which is moved upwardly, as shown in broken lines in Figure 8, and the mercury tube 105 is inclined to contact position with the electrodes 106 to close the circuit, causing the motor 96 to operate and rotate the agitator paddle 70 and to open the valve 47 to permit additional water to enter the carbonator tank 29 and simultaneously agitate the incoming water with the incoming carbonic gas to produce carbonated water at a predetermined pressure. When the elevation of the carbonated water in the carbonator tank 29 has increased to a predetermined height, the float 112 and rod 109 automatically move the mercury tube 105 to the oppositely inclined position, to break the circuit and cause the motor 96 to cease its operations, and the agitator paddle 70 its rotation, and to close the valve 47, cutting off additional flow of water into the carbonator tank 29.

A tubular member 121 (see Figures 9 and 10) has one end 122 threaded into the front wall 31 of the carbonator tank 29 and is secured in sealing relation therewith by a gasket and nut connection, as indicated at 123, and the other end 124 of the tubular member 121 is provided with an annular flange 125 which abuts the inner surface of the front wall 32 of the ice-box 21, and is secured thereto by a nut 127 threaded onto the end 124 of the tubular member 121. The tubular member has an outwardly tapered inner surface adapted to frictionally embrace a corresponding tapered inner end 128 of a faucet 129. The tapered end 128 is partially closed by an integral partition having a plurality of annularly arranged apertures 130 which surround a central aperture 131. The apertures 130 communicate with an enlarged chamber 132 of the faucet 129 which communicates with a depending discharge nozzle 133.

The forward end portion of the faucet 129 is provided with a chamber 134 closed at its outer end by a detachable cap 135 threaded into the faucet 129. The chamber 134 is closed at its inner end by a partition wall 136 having an aperture 137, for a purpose hereinafter described. Extending through the chamber 134 is a pin 138 journalled in diametrically disposed lugs 139. The pin 138 is rigidly affixed, by means of a screw 140, to the bifurcated arms 141 of a faucet handle 142, and secured to the pin 138, within the chamber 134, by a screw 143, is a cam 144, adapted to engage, when the faucet handle 142 is manipulated, a disc 145 threaded to one end of a valve rod 146 slidably mounted in the apertures 137 and 131.

The opposite end of the valve rod 146 is slidably mounted in a partition wall 147 disposed short of the end 148 of the tubular member 121. The valve rod 146 extends into the carbonator tank 29 and is adapted to engage a valve 301 provided with a valve disc 149 mounted on a plunger 300 having a stud 150 slidable within a recess 151 of a valve cap 152 threaded to the extreme end 148 of the tubular member 121. The valve 301 is yieldably mounted by means of a spring 153 interposed between the valve cap 152 and the plunger 300. The valve cap 152 is provided with annularly arranged ports 154, and the partition wall 147 is provided with ports 155 to establish communication between the interior of the carbonator tank 29 and the interior 156 of the tubular member 121. The flow of carbonated water from the carbonator tank 29 is controlled by the faucet handle 142, which when rotated downwardly moves the valve rod 146 inwardly to open the ports 154 and permit the flow of carbonated water through the ports 155 and 130 and thence from the discharge nozzle 133.

The tubular member 121 has a flat surface, as at 160, to support a cylinder 161, of predetermined capacity, having a tapered port 162, adapted to serve as a valve seat alined with an aperture 163 in the flat surface 160. Secured within the alined apertures 162 and 163 is a valve cage 164, its lower end partially closed by a spider member 165 adapted to support a spring 200 which yieldably supports a ball valve 167 in sealing engagement with the valve seat 162.

Reciprocally mounted within the cylinder 161 is a piston 168 having a port 169 extending therethrough, one end of which is partially closed by a spider member 170, and the other end of which is provided with a valve seat 171 adapted to be engaged by a ball valve 172 yieldably supported by a spring 173 interposed between the ball valve 172 and the spider member 170. The ends of the piston 168 are provided with packing members 174 and 175, and washers 176 and 177. The packing member 174 and washer 176 have openings that are alined with the port 169, and are secured to one face of the piston 168 between a shouldered portion of a piston rod 178 which has one end threaded into the piston 168. The piston rod 178 extends through a stuffing box 179 carried by a head 180 secured to the forward end of the cylinder 161. The outer end of the piston rod 178 is pivotally connected, as at 181, to a link 182 pivotally secured to the faucet handle 142, as at 183. The packing 175 and washer 177 are also provided with openings that are alined with the port 169. The elements are secured to the opposite face of the piston 168 by a screw 184 threaded thereinto.

The cylinder 161 is closed at its rear end by a head 185 having an outwardly and upwardly extending projection 186 provided with an angular bore 187 communicating with the cylinder 161. The lower end of the bore 187, is provided with a valve seat 189 for a ball valve 190 yieldably held in position by a spring 191 removably secured by a spider member 192 affixed at the inner end of the bore 187. The outer end of the bore 187 is outwardly and upwardly tapered to frictionally accommodate a correspondingly tapered flexible member 193 secured to a nipple 194 abutting against the bottom of a syrup container 195 and secured thereto by a collar 196. The syrup container 195 is supported in the bore 187, and is easily removed from the cabinet 12 by lifting it upwardly from the bore 187. Additional syrup may be added to the container 195 by removing a detachable plug 197.

Figure 9:
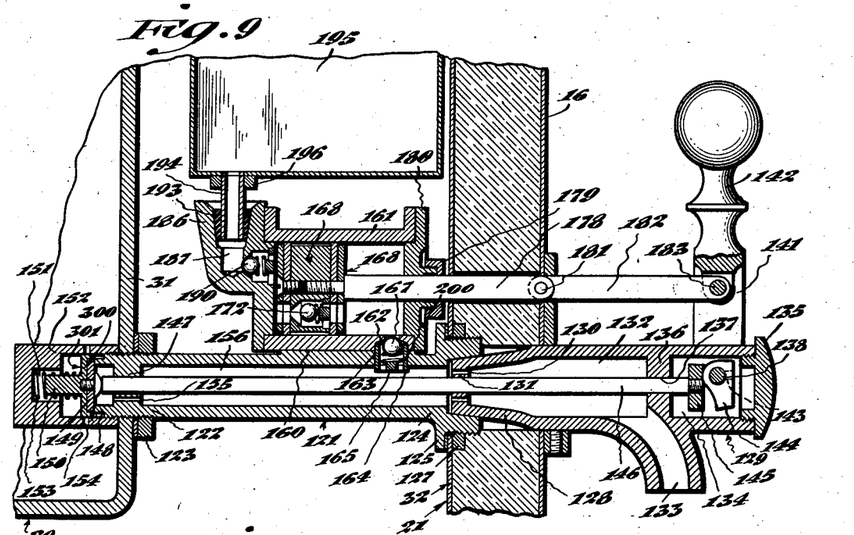
Figure 9 is an enlarged fragmentary, vertical sectional view, corresponding substantially to the line 9—9 of Figure 3, showing the apparatus in one operative position.
Figure 10:
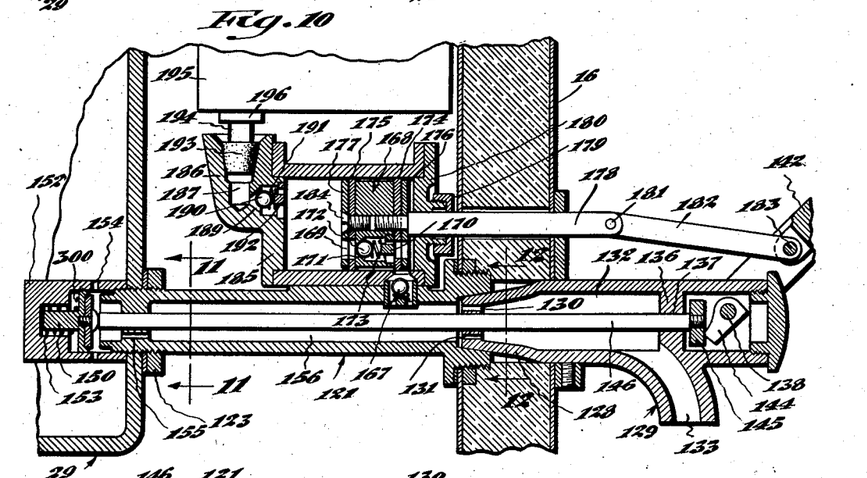
Figure 10 is an enlarged fragmentary, vertical sectional view, corresponding substantially to the line 9—9, of Figure 3, showing the apparatus in another operative position.
Figure 11:
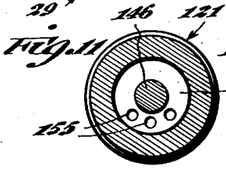
Figure 11 is an enlarged vertical sectional view, corresponding substantially to the line 11—11 of Figure 10.
Figure 12:
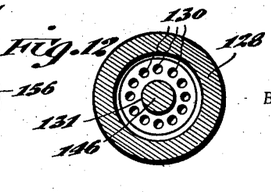
Figure 12 is an enlarged vertical sectional view, corresponding substantially to the line 12—12 of Figure 10.
Figure 13:
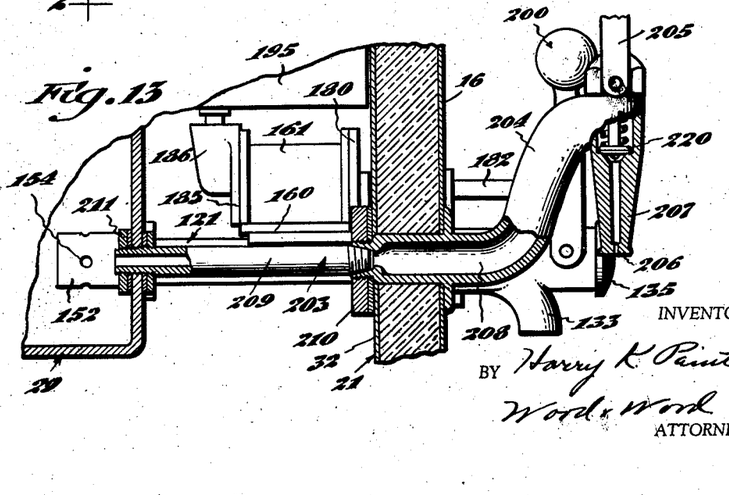
Figure 13 is an enlarged fragmentary, vertical sectional view, corresponding substantially to the line 13—13 of Figure 3.

In operation, assuming that the apparatus is in the position as shown in Figure 9, and the cylinder 161 has not been supplied with flavoring syrup from the syrup container 195, the faucet handle 142 is rotated forwardly, which movement unseats the valve 190 and causes the elements associated therewith to assume the position as shown in Figure 10, creating a partial vacuum in the cylinder 161, causing syrup to flow from the container 195 into the rear part of the cylinder 161. The faucet handle 142 is then rotated to its original and normal position, as indicated in Figure 9, which movement seats the valve 190 and prevents further discharge of syrup from the container 195, and unseats the valve 172, permitting the charge of syrup in the rear of the cylinder 161 to flow through the port 169 and the piston 168 to the front end of the cylinder 161, where the syrup is held by the valve 167. The faucet handle 142 is again rotated downwardly and the piston 168 moved forwardly, which movement seats the valve 172 to prevent further flow of syrup therepast, but unseats the valve 167 forcing the charge of syrup in the front end of the cylinder 168 into the mixing chamber 156.

Each rearward movement of the faucet handle 142 thereafter forces a new charge of syrup from the container 195, into the forward portion of the cylinder 161, so that only one downward movement is necessary to force the new charge of syrup into the mixing chamber 156. During the forward movement of the faucet handle 142, the carbonator valve 301 is unseated by the cam 144 and valve rod 146, to permit the carbonated water to pass through the small apertures 155 under pressure exerted by the carbonic gas contained in the carbonated water and the gas above the water in the tank 29, into the mixing chamber 156, whereby the charge of syrup is intimately mixed under pressure of the gas with the carbonated water and forced through the apertures 130, and thence forced through the discharge nozzle 133 in the form of a beverage already prepared for consumption.

The dispensing apparatus thus described requires but a forward and rearward movement of the faucet handle 142 to dispense a carbonated flavored beverage. The charges of syrup from the cylinder 161 can be altered by inserting cylinders of various capacities.

It is apparent that one or more dispensing and mixing units can be used in connection with the same cabinet, and carbonating tank. I have shown in this embodiment of my invention three dispensing and mixing units 200, 201 and 202 in addition to the dispensing and mixing unit hereinbefore described, and the units 200, 201, and 202 are constructed identically and operate identically with the unit heretofore described.

I have also made provision for dispensing unadulterated carbonated water directly from the carbonator tank 29. The mechanism employed in that connection comprises a dispensing unit 203 having a faucet 204 disposed between the units 200 and 201 and threaded to the front wall of the cabinet 12, and is provided with a suitable valve 220 operated in the usual manner by a faucet handle 205. The faucet 204 has a reduced outlet 206 in a depending nozzle 207 which communicates with an enlarged channel 208, terminating in a pipe 209 having one end threaded to the end of the faucet 204 and the other end terminating within the carbonator tank 29 in direct communication with the carbonated water therein. The inner end of the faucet 204 is secured to the inner surface of the front wall of the ice-box 21 by a gasket and nut arrangement as indicated at 210. The inner end of the pipe 209 is secured to the carbonator tank 29 by a gasket and nut arrangement as shown at 211.

When the faucet handle 205 is moved forwardly, the carbonated water is dispensed with considerable force through the reduced outlet 206. The force of the ejection being sufficient to disintegrate ice-cream, and to completely mix flavored syrups with the carbonated water. A tray 212 is secured to the frame 10, to support glasses, or the like, during the dispensing operation.

It will be understood by those skilled in the art that the embodiment herein disclosed accomplishes at least the principal object of the invention, that it has uses and advantages other than those herein particularly referred to, and that various changes and modifications may be made without departing from the spirit of the invention, and accordingly the embodiment disclosed herein is illustrative only and the invention is not limited thereto.

Having described my invention, I claim:

1. A dispensing apparatus for carbonated beverages comprising a first container for receiving a supply of carbonated water, a second container containing a supply of flavoring syrup, a delivery tube extending from the first container and having a spout at its outer end, a syrup measuring cylinder disposed between the second container and an intermediate portion of the tube and in communication with the second container and tube respectively, a piston in the syrup measuring cylinder, a valve at the entrance from the first container to the tube, a common means for moving said piston and unseating said valve, said cylinder including a spring-seated valve at the entrance thereto from the second container, said valve arranged to unseat when the piston is moved in its delivery stroke, a second spring-seated valve disposed between the cylinder and the tube arranged to unseat to delivery pressure, and a third valve within the piston arranged to unseat on return stroke of the piston for permitting the charge of flavoring syrup drawn into the cylinder on the delivery stroke to pass through the piston to the delivery side thereof.

2. A dispensing apparatus for carbonated beverages comprising, a first container for carbonated water, a second container for flavoring syrup, a common chamber receiving the carbonated water and the flavoring syrup, a measuring and feeding device for delivery of a predetermined quantity of syrup to said common chamber, a carbonated water release valve between said first container and said common chamber, means for operating said valve and said measuring and feeding device, an outlet from said common chamber for delivery the mixture, an instrumentality for causing retarding of the flow of carbonated water and syrup before it reaches the outlet and for causing thorough mixing before delivery, said common chamber constantly opened to the atmosphere said chamber arranged so that the flow of carbonated water is substantially horizontal and said measuring and feeding device arranged to deliver the flavoring syrup under pressure whereby the common chamber is always drained after each delivery and the delivery of a fresh charge is assured each time the device is operated.

3. A dispensing apparatus for carbonated beverages comprising a first container for carbonated water, a second container for flavoring syrup, a common chamber receiving the carbonated water and the flavoring syrup, a measuring and feeding device for delivering a predetermined quantity of syrup to said common chamber, a syrup release valve disposed between said measuring and feeding device and said common chamber and adapted to open under the pressure created by the device, a carbonated water release valve disposed between said first container and said common chamber, means for operating said valve and said measuring and feeding device, said common chamber including an outlet and constricted adjacent the outlet for causing commingling of the carbonated water and syrup before the carbonated water and syrup passes through the outlet, said common chamber constantly open to the atmosphere, said measuring and feeding device arranged to deliver the flavoring syrup under pressure whereby the common chamber is always drained after each delivery, and the delivery of a fresh charge is insured each time the device is operated.

HARRY K. PAINTER.